(12) United States Patent
Cai

(10) Patent No.: US 7,622,843 B2
(45) Date of Patent: Nov. 24, 2009

(54) TERMINALS AND CONNECTIONS BETWEEN MULTI-SET SEGMENTED HAIRPIN WINDINGS

(75) Inventor: Wei Cai, Carmel, IN (US)

(73) Assignee: Rerry International, Inc., Anderson, IN (US)

( * ) Notice: Subject to any disclaimer, the term of this patent is extended or adjusted under 35 U.S.C. 154(b) by 13 days.

(21) Appl. No.: 11/811,472

(22) Filed: Jun. 11, 2007

(65) Prior Publication Data

US 2008/0042508 A1    Feb. 21, 2008

Related U.S. Application Data

(60) Provisional application No. 60/812,860, filed on Jun. 12, 2006.

(51) Int. Cl.
H02K 1/00    (2006.01)
(52) U.S. Cl. ....................................................... 310/179
(58) Field of Classification Search ................. 310/189, 310/179, 201, 71
See application file for complete search history.

(56) References Cited

U.S. PATENT DOCUMENTS

| | | | |
|---|---|---|---|
| 4,039,875 A | 8/1977 | Morreale | |
| 5,081,382 A | 1/1992 | Collings et al. | |
| 6,198,190 B1 | 3/2001 | Umeda et al. | |
| 6,285,105 B1 | 9/2001 | Asao et al. | |
| 6,750,581 B2 | 6/2004 | Neet | |
| 6,894,417 B2 | 5/2005 | Cai et al. | |
| 7,256,364 B2 * | 8/2007 | Gentry et al. | ............ 219/85.15 |

FOREIGN PATENT DOCUMENTS

FR    2808935    11/2001

* cited by examiner

*Primary Examiner*—Nguyen N Hanh
(74) *Attorney, Agent, or Firm*—Maginot, Moore & Beck

(57) ABSTRACT

An electric machine is disclosed herein comprising a core with a plurality of slots, the core including an insertion side and an opposing side. A winding arrangement is provided in the plurality of slots of the core. The winding arrangement is comprised of a plurality of differently shaped hairpin conductors. Each of the plurality of differently shaped hairpin conductors includes at least one leg inserted into one of the plurality of slots, with a leg end of the at least one leg extending from the opposing side of the core. All the leg ends extending from the opposing side of the core are bent the same number of slots and connected to immediately adjacent leg ends at the opposing side of the core. Thus, all connections between the differently shaped hairpin conductors are provided at the opposing side of the core.

20 Claims, 15 Drawing Sheets

ALL CONNECTIONS OF JUMPERS AND TERMINALS AS WELL AS NEUTRAL (IF APPLICABLE) AT INSERTION SIDE OF THE STACK (1) THREE U-SHAPE HAIRPINS IN LAYER 1 ARE USED TO CONNECT WINDING PATHS IN THE SAME PHASE
(2) SIX U-SHAPE HAIRPINS BETWEEN LAYERS 2 & 3 ARE USED TO CONNECT WINDING PATHS BETWEEN SETS
(3) ONE BIG U-SHAPE HAIRPIN (CROSS $S_{A2}$ AND $S_{B2}$) IN LAYER 4 AND A HALF TURN WIRE $S_{C2}$ ARE CONNECTED INTO NEUTRAL POINT. THE $S_{A1}$, $S_{A2}$, $S_{B1}$, $S_{B2}$, $S_{C1}$ AND $S_{C2}$ CAN ALSO BE CONNECTED INTO DELTA=CONNECTION THROUGH THREE SPECIAL HAIRPINS

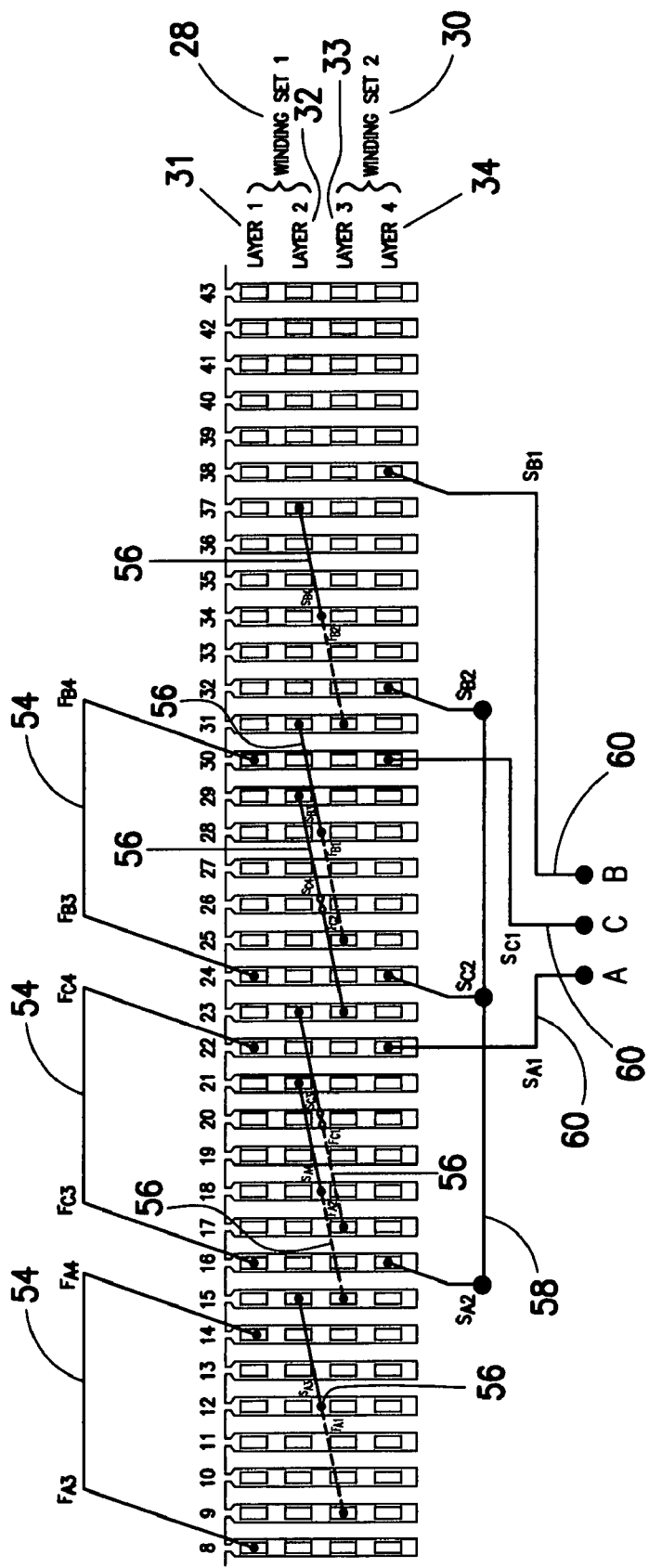

FIG. 7

ALL CONNECTIONS OF JUMPERS AND TERMINALS AS WELL AS NEUTRAL (IF APPLICABLE) AT INSERTION SIDE OF THE STACK (1) THREE U-SHAPE HAIRPINS IN LAYER 1 ARE USED TO CONNECT WINDING PATHS IN THE SAME PHASE
(2) SIX U-SHAPE HAIRPINS BETWEEN LAYERS 2 & 3 ARE USED TO CONNECT WINDING PATHS BETWEEN SETS
(3) ONE BIG U-SHAPE HAIRPIN (CROSS $S_{A2}$ AND $S_{B2}$) IN LAYER 4 AND A HALF TURN WIRE $S_{C2}$ ARE CONNECTED INTO NEUTRAL POINT. THE $S_{A1}$, $S_{A2}$, $S_{B1}$, $S_{B2}$, $S_{C1}$ AND $S_{C2}$ CAN ALSO BE CONNECTED INTO DELTA=CONNECTION THROUGH THREE SPECIAL HAIRPINS

LAYERS 1 & 2 (SOLID LINE REPRESENTS LAYER 2; DASH LINE REPRESENTS LAYER 1)

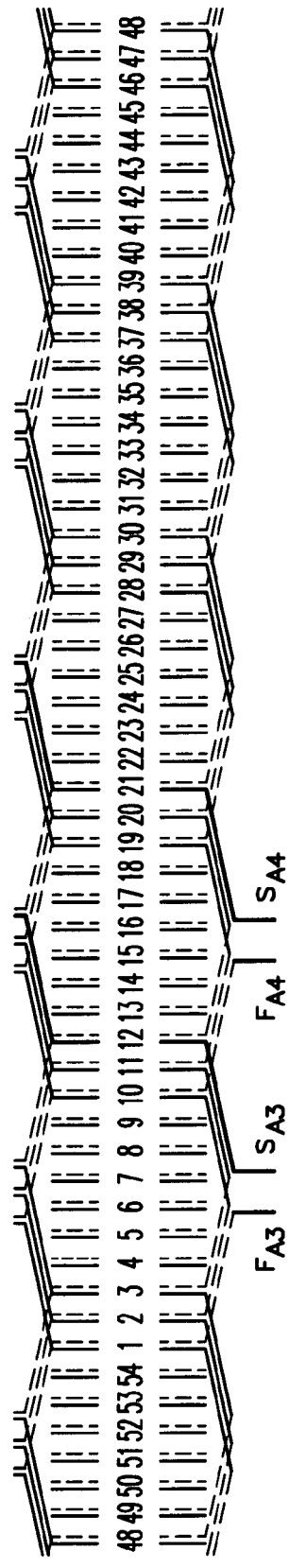

LAYERS 3 & 4 (SOLID LINE REPRESENTS LAYER 4; DASH LINE REPRESENTS LAYER 3)

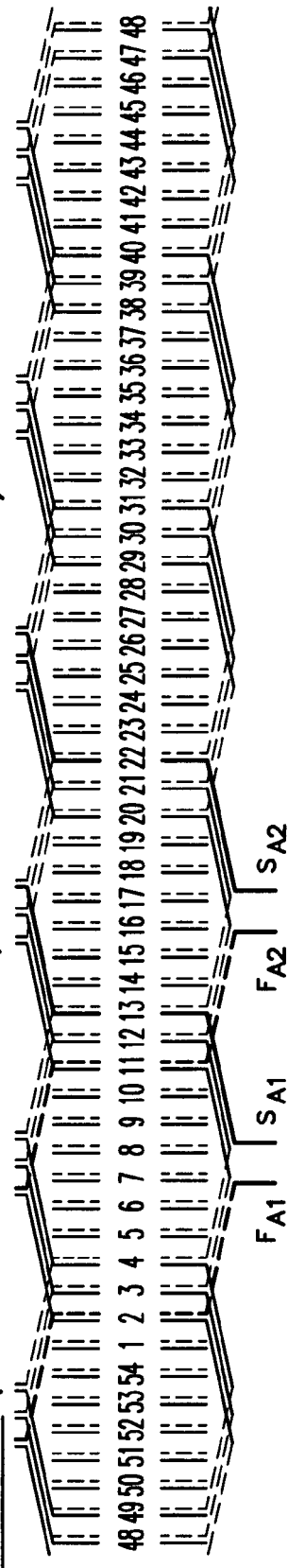

PHASE A CONNECTIONS: (1) $F_{A1}$ OF LAYER 3 AND $S_{A3}$ OF LAYER 2 ARE THE SAME ARC TOP POINT OF A SPECIAL HAIRPIN, WHOSE 2 LEGS ARE LOCATED IN SLOT 2 AND SLOT 12 (SHOWN BY THICKER LINE).
(2) $F_{A2}$ OF LAYER 3 AND $S_{A4}$ OF LAYER 2 ARE THE SAME ARC TOP POINT OF A SPECIAL HAIRPIN, WHOSE 2 LEGS ARE LOCATED IN SLOT 11 AND SLOT 21 (SHOWN BY THICKER LINE).
(3) LEAVE $F_{A3}$ OF LAYER 1 FOR Y-CONNECTION NEUTRAL 1, AND LEAVE $S_{A2}$ OF LAYER 4 FOR Y-CONNECTION NEUTRAL 2
(4) END-TURN ELEVATION ANGLE FOR WINDING SET 1 (LAYERS 1 & 2) IS 8~10° WHILE END TURN ELEVATION ANGLE FOR WINDING SET 2 (LAYERS 3 & 4) IS 11~13°

$S_{A1}$ OF LAYER 4 AND $F_{A4}$ OF LAYER 1 CROSS END-TURN ARE PARALLEL, AND BECOME THE TERMINAL OF PHASE A

FIG. 9A

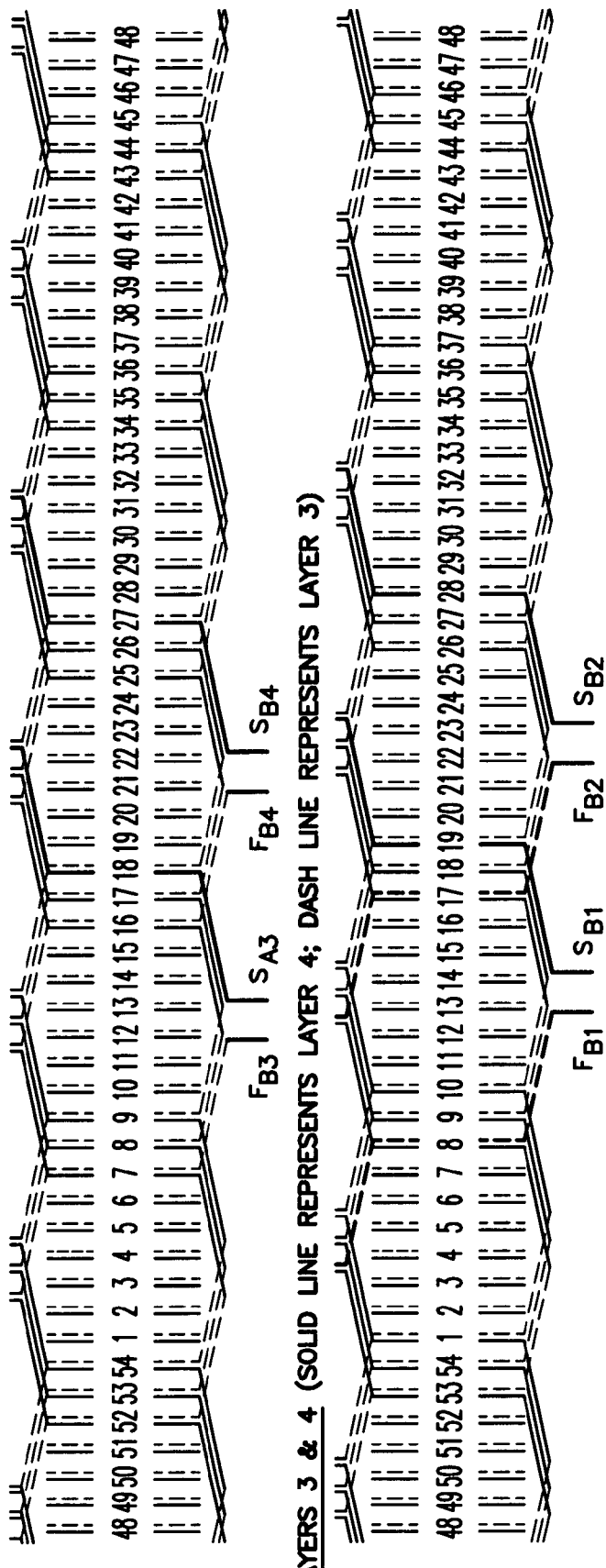

LAYERS 1 & 2 (SOLID LINE REPRESENTS LAYER 2; DASH LINE REPRESENTS LAYER 1)

LAYERS 3 & 4 (SOLID LINE REPRESENTS LAYER 4; DASH LINE REPRESENTS LAYER 3)

PHASE B CONNECTIONS: (1) $F_{B1}$ OF LAYER 3 AND $S_{A3}$ OF LAYER 2 ARE THE SAME ARC TOP POINT OF A SPECIAL HAIRPIN, WHOSE 2 LEGS ARE LOCATED IN SLOT 8 AND SLOT 18 (SHOWN BY THICKER LINE).
(2) $F_{B2}$ OF LAYER 3 AND $S_{B4}$ OF LAYER 2 ARE THE SAME ARC TOP POINT OF A SPECIAL HAIRPIN, WHOSE 2 LEGS ARE LOCATED IN SLOT 17 AND SLOT 27 (SHOWN BY THICKER LINE).
(3) LEAVE $F_{B3}$ OF LAYER 1 FOR Y-CONNECTION NEUTRAL 1, AND LEAVE $S_{B2}$ OF LAYER 4 FOR Y-CONNECTION NEUTRAL 2
(4) END-TURN ELEVATION ANGLE FOR WINDING SET 1 (LAYERS 1 & 2) IS 8~10° WHILE END TURN ELEVATION ANGLE FOR WINDING SET 2 (LAYERS 3 & 4) IS 11°~13°

$S_{B1}$ OF LAYER 4 AND $F_{B4}$ OF LAYER 1 CROSS END-TURN ARE PARALLEL, AND BECOME THE TERMINAL OF PHASE B

FIG. 9B

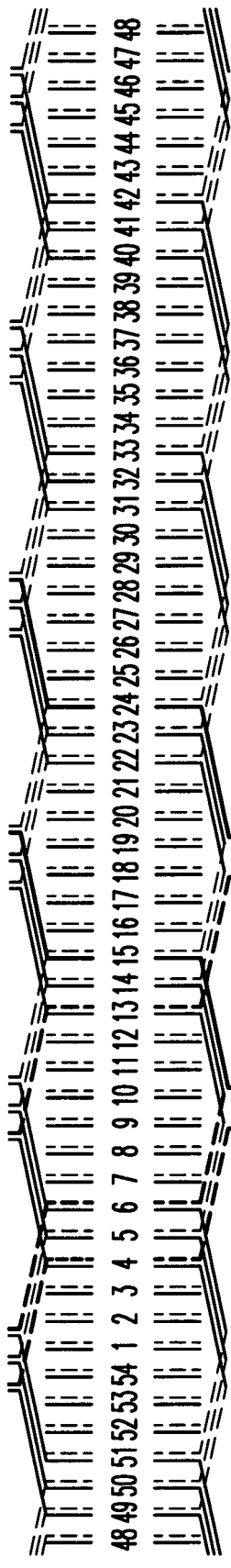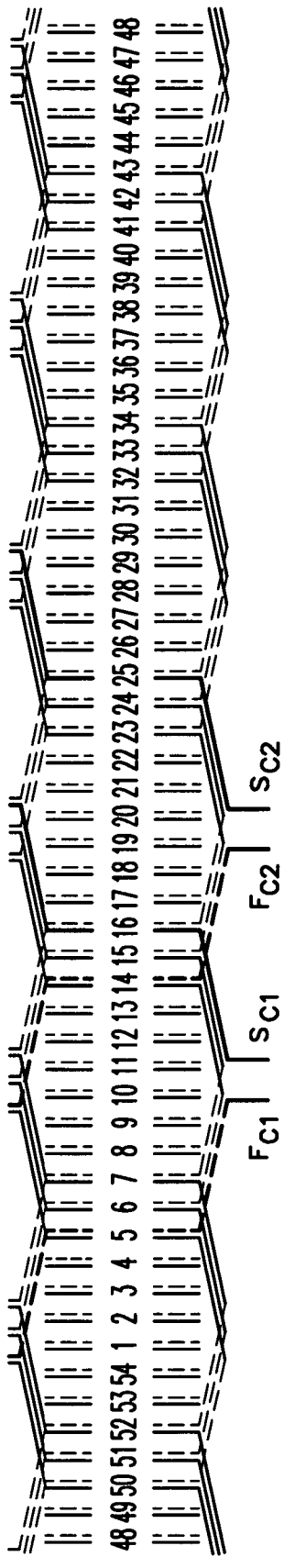
FIG. 9C

TERMINALS AND CONNECTIONS BETWEEN MULTI-SET SEGMENTED HAIRPIN WINDINGS

CROSS-REFERENCE TO RELATED APPLICATIONS

This application claims the benefit of earlier filed U.S. provisional application No. 60/812,860, filed Jun. 12, 2006.

FIELD

This application relates to the field of electric machines, and more particularly electric machines having multi-set segmented hairpin or U-shaped windings.

BACKGROUND

Multi-set segmented windings are commonly used in modern electrical machine applications, such as in hybrid-electric vehicles. These windings typically comprise a plurality of U-shaped segmented conductors which include two legs and a central U-turn portion between the legs. The U-shaped conductors are often formed with a rectangular cross-section. The U-shaped conductors are positioned in the slots of a core portion of the electric machine, such as the stator slots, to form armature windings for the machine. These U-shaped conductors may also be referred to herein as "U-shaped bars". The terms "U-shaped conductor", "U-shaped bar" and "U-turn portion" are not intended to refer to a conductor or a conductor portion that forms a perfect "U" shape, but instead refers to a conductor or a conductor portion where the conductor changes axial direction by more than 90°, such as by about 180°. The term "hairpin" as used herein is not intended to be limited to U-shaped conductors, and instead refers generally to a distinct conductor segment having two ends, whether or not a U-shaped portion is included between the two ends.

With multi-set segmented hairpin windings, the U-shaped conductors are created by bending and twisting wire bars into U-shaped conductors with two legs and a U-turn between the legs. The two legs are separated by a given span which allows the conductor to extend across a number of stator slots by virtue of the U-turn alone. The legs of the hairpin conductors are then inserted into the slots from an insertion end of the stator. Following insertion of the hairpins, the bend portions are provided on one side of the stator (the "insertion side") and the leg ends extend from the other side of the stator (the "connection side" or "weld side"). The legs ends are then bent to appropriate positions, with a first leg typically bent in one direction and another leg bent in the opposite direction such that the entire hairpin extends a given slot span (e.g., 12 slots). Finally, the proper leg ends are connected together at the connection side of the stator to complete the windings. These connections include adjacent leg ends that are aligned directly and welded together, non-adjacent leg ends that are connected through jumper wires, and terminal connections that lead to the winding phases. Together, the connected conductors form the complete armature winding arrangement.

With the above winding arrangement, the insertion side of the stator is typically clean and includes only the U-shaped turn portions of the conductors. However, the connection side is significantly more crowded. First, the leg ends, which are already very closely aligned at the connection side, are made even more crowded by the welding points between adjacent leg ends. In addition, the connection wires, including jumpers between windings sets, phase path connections, neutral connections, and terminal connections cause additional jam in the crowded hairpin welding points. The resulting clearance reduction between conductors creates potential short circuits during welding and other defects during production.

In addition to crowding at the connection end of the stator, the additional jumpers and terminals require more clearance for the electric machine at the connection end. In many applications, including hybrid electric vehicle applications, the compartment holding the electric machine is already crowded and it is difficult to find additional space for the increased clearance of the electric machine at the connection end.

Accordingly, it would be advantageous if a winding arrangement could be provided where the overall clearance required for the electric machine in an application compartment is decreased. It would also be desirable to provide a multi-set segmented hairpin winding arrangement where the crowding at the connection end of the stator is reduced. It would be of further advantage if such winding arrangement could be provided such that the electric machine may be easily manufactured, thus reducing manufacturing costs. It would also be advantageous if the winding arrangement resulted in decreased incidence of manufacturing errors.

It would be desirable to provide an electric that provides one or more of these or other advantageous features as may be apparent to those reviewing this disclosure. However, the teachings disclosed herein extend to those embodiments which fall within the scope of the appended claims, regardless of whether they accomplish one or more of the above-mentioned advantages.

SUMMARY

An electric machine is disclosed herein comprising a core with a plurality of slots, the core including an insertion side and an opposing side. A winding arrangement is provided in the plurality of slots of the core. The winding arrangement is comprised of a plurality of differently shaped hairpin conductors. Each of the plurality of differently shaped hairpin conductors includes at least one leg inserted into one of the plurality of slots, with a leg end of the at least one leg extending from the opposing side of the core.

The plurality of differently shaped hairpin conductors form a first multi-phase winding set and a second multi-phase winding set. The first winding set is provided in a first conductor layer and a second conductor layer in the plurality of slots. The second winding set is provided in a third conductor layer and a fourth conductor layer in the plurality of slots.

All the leg ends extending from the opposing side of the core are bent the same number of slots and connected to immediately adjacent leg ends at the opposing side of the core. Thus, all connections between the differently shaped hairpin conductors are provided at the opposing side of the core. All of the differently shaped hairpin conductors, with the exception of hairpin conductors that provide terminal connections, include U-turn portions provided at the insertion side of the core. No connections between any hairpin conductors are made at the insertion side of the core.

The plurality of differently shaped hairpin conductors comprise (i) a plurality of standard hairpin conductors that form the main portion of the phase windings, (ii) a plurality of short pitch hairpin conductors, (iii) a plurality of hairpin conductors configured to connect phase windings of the same phase in series; (ii) a plurality of hairpin conductors configured to connect the first winding set and the second winding set; (iii) a hairpin conductor configured to connect neutral connections between phase windings; and (iv) terminal connections for the phase windings.

BRIEF DESCRIPTION OF THE DRAWINGS

FIG. 7 shows special connections made at an insertion side of the core in the exemplary winding arrangement of FIGS. 6A-6C;

FIGS. 9A-9D show the winding diagram for another exemplary winding arrangement.

DESCRIPTION

Figure 1:
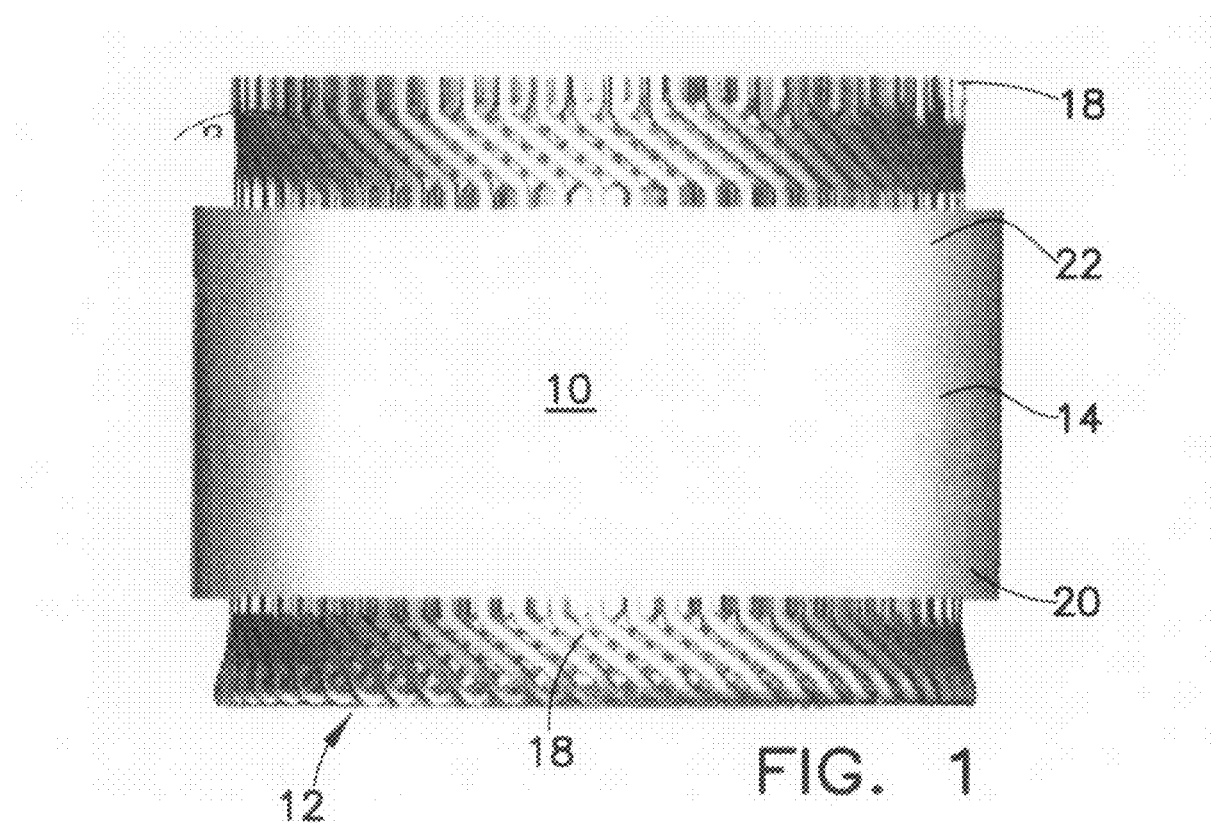
FIG. 1 shows a side view of an exemplary electric machine core with a winding arrangement provided thereon.

FIG. 1 shows a side view of an exemplary electric machine core, such as a stator 10, which is configured to hold the winding arrangement disclosed herein. An armature winding arrangement 12 is provided on the stator 10. The stator includes a main body portion 14 with a plurality of slots 16 (see FIG. 2) formed therein. A plurality of hairpin conductors 18 are placed in slots of the stator 10 to form the armature winding arrangement 12. The hairpin conductors 18 define an insertion side 20 of the stator 10 from which the hairpins are inserted into the slots. Opposite the insertion side of the stator is a "weld side" or "opposite side" 22 of the stator 10.

Figure 2:
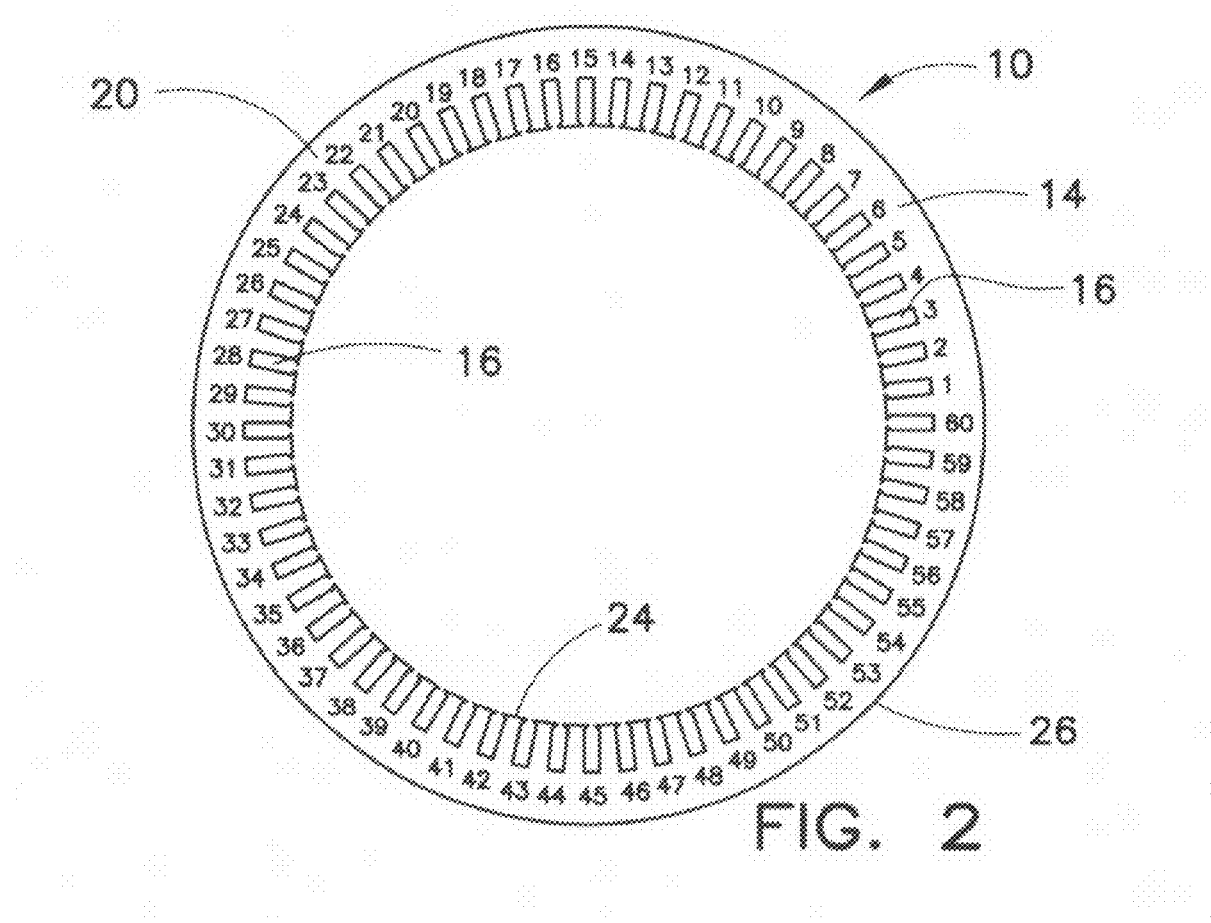
FIG. 2 shows a top view of the exemplary electric machine core of FIG. 1 without the winding arrangement to show the slots of the core.

FIG. 2 shows a top view of the insertion side 20 of the exemplary electric machine core 10 of FIG. 1 without the armature windings 18 placed in the stator slots 16. As shown in FIG. 2, the stator is generally disc shaped with an inner circumferential perimeter 24 and an outer circumferential perimeter 26. The exemplary stator 10 of FIG. 2 includes sixty slots 16. Openings to the stator slots are provided through the inner perimeter 24 as well as the insertion side 20 and weld side 22 of the stator.

Figure 3:
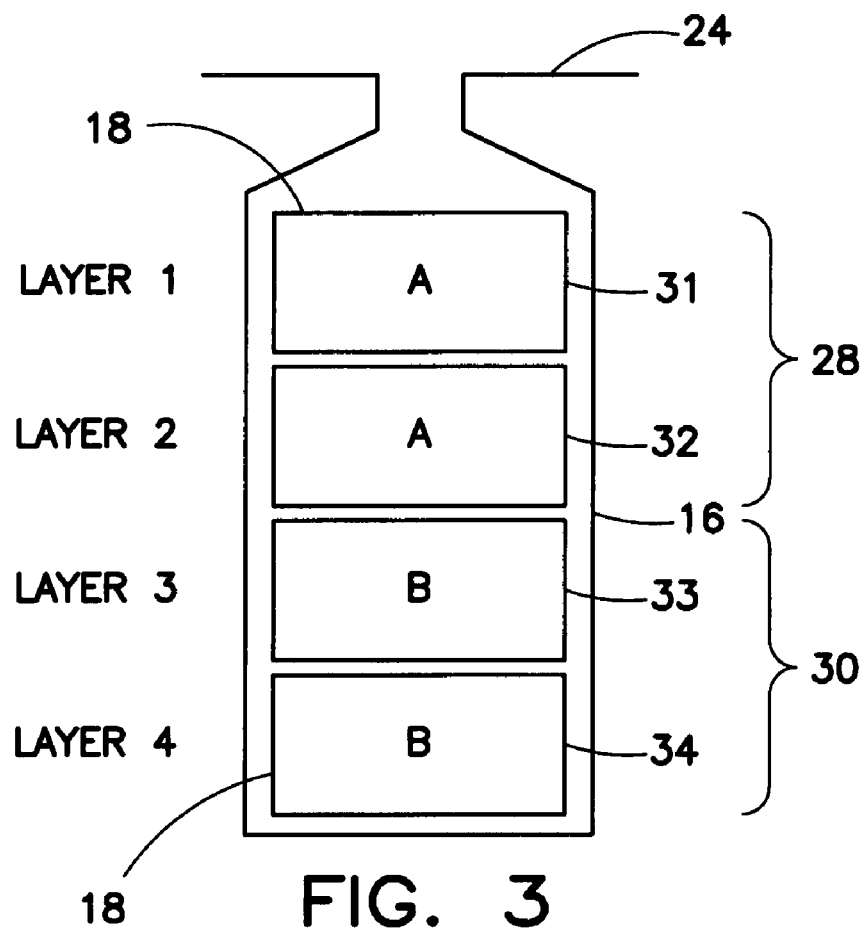
FIG. 3 shows an enlarged cross-sectional view of one of the slots of the core of FIG. 2.

FIG. 3 shows an enlarged cross-sectional view of one of the slots 16 of the stator 10 with the hairpin conductors 18 placed in the stator. As shown in FIG. 3, each slot includes two winding sets, including a first winding set 28 and a second winding set 30. The first winding set 28 includes two conductors of one phase (e.g., phase A in FIG. 3) and the second winding 30 set includes two conductors of another phase (e.g., phase B in FIG. 3). Similarly, each of the other slots in the exemplary embodiment also comprise two conductors of one phase and two conductors of another phase. In other embodiments, it is also possible that each of the slots contains all four conductors in the same phase. The exemplary winding arrangement disclosed herein is a three phase winding arrangement, including phases A, B, and C. However, it will be recognized that principles disclosed herein may also be applied to other multi-phase arrangements.

With continued reference to FIG. 3, segmented bar-shaped hairpin conductors 18 of rectangular cross-section are used to form the armature windings. The rectangular conductors 18 are arranged in four layers, layer one 31 positioned closest to the inner perimeter 24 of the stator, and followed by layer two 32, layer three 33, and layer four 34 positioned closest to the outer perimeter 26 of the stator. Layers one 31 and two 32 form the first winding set 28 and layers three 33 and four 34 form the second winding set 30. Rectangular conductors 18 arranged in this manner are useful in order to incorporate the advantages of semi-closed or fully-closed armature slots with a high slot fill ratio. The applications of multi-set segmented bar shape hairpin windings can further reduce AC resistance, as described in U.S. patent application Ser. No. 11/187,138, the contents of which are incorporated herein by reference in its entirety.

Figure 4:
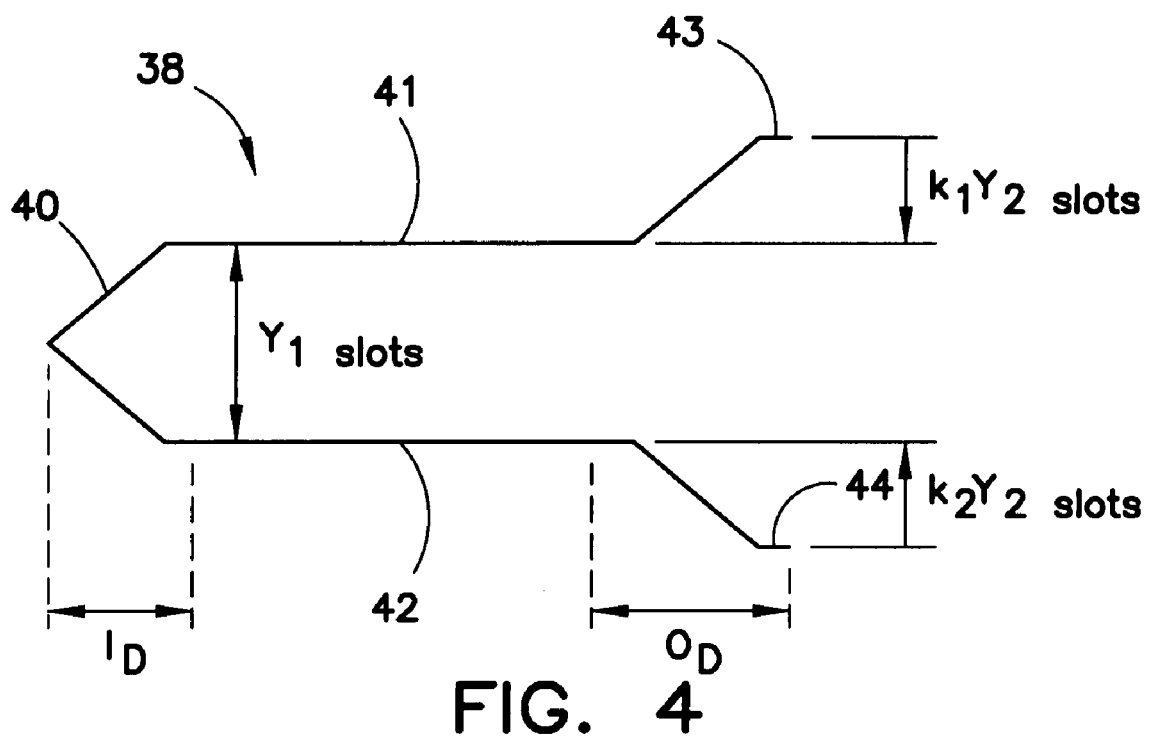
FIG. 4 shows an exemplary hairpin conductor used in the winding arrangement of FIG. 1.

An exemplary U-shaped hairpin conductor 38 of rectangular cross-section is shown in FIG. 4. The hairpin conductor 38 includes two legs 41 and 42 separated by a U-shaped turn portion 40. Each leg 41, 42 includes an associated leg end 43, 44. The direction of the conductor 38 changes at the U-turn portion 40 such that the electrical path provided by the conductor makes a "U-turn" or a substantially 180° turn at the U-turn portion 40.

The hairpin 38 of FIG. 4 formed from a straight conductor segment with a rectangular cross-section. However, before the hairpin 38 is inserted into the stator, a machine bends the hairpin to create the U-turn portion 40 with two substantially straight legs 41, 42. After the U-turn portion 40 is created, the hairpin 38 is inserted into the stator, legs first, from the insertion side 20. The legs 41, 42 are inserted into different slots (and in different layers), as noted in FIG. 4 by the designation $Y_1$, showing that the distance between the legs is equal to a distance that traverses a given number of slots. The legs 41, 42 are made to pass through the stator slots and extend out the opposite side 22 of the stator. After being inserted in the stator, the leg ends 43, 44 are bent by a machine in opposite directions by a predetermined distance, thus moving the leg ends 43 of the conductor another predetermined number of slots. In FIG. 4 this distance is indicated as $k_1Y_2$ slots and $k_2Y_2$ slots. Once the conductor 38 is situated in the stator, the U-turn portion 40 will extend a distance $I_D$ from the insertion side 24 of the stator and the leg ends 43, 44 will extend a distance $O_D$ from the opposite side 26 of the stator.

FIGS. 5A-5F show differently shaped hairpin conductors that may be used to create an exemplary embodiment of the armature windings which are disclosed in FIGS. 6A-6C, described below. The winding arrangement is provided on a sixty slot stator. The winding arrangement is a three phase winding with four layers of conductors in each slot and two different sets of windings provided in the winding slots (see, e.g., FIG. 3). As will be explained in further detail below, the winding arrangement provides for all leg ends to be bent an equal number of slots and connected to adjacent leg ends on the weld side 18 of the stator without the need for additional jumpers or other connections on the weld side or connection side of the stator. Instead, the winding arrangement uses a plurality of differently shaped hairpin conductors to make winding connections (e.g., phase-to-phase connections, and set-to-set connections on the insertion side of the stator). In particular, the winding arrangement of FIGS. 6A-6C calls for eight differently shaped hairpin conductors. Each of these eight conductors is described in the paragraphs below.

Figure 5A:
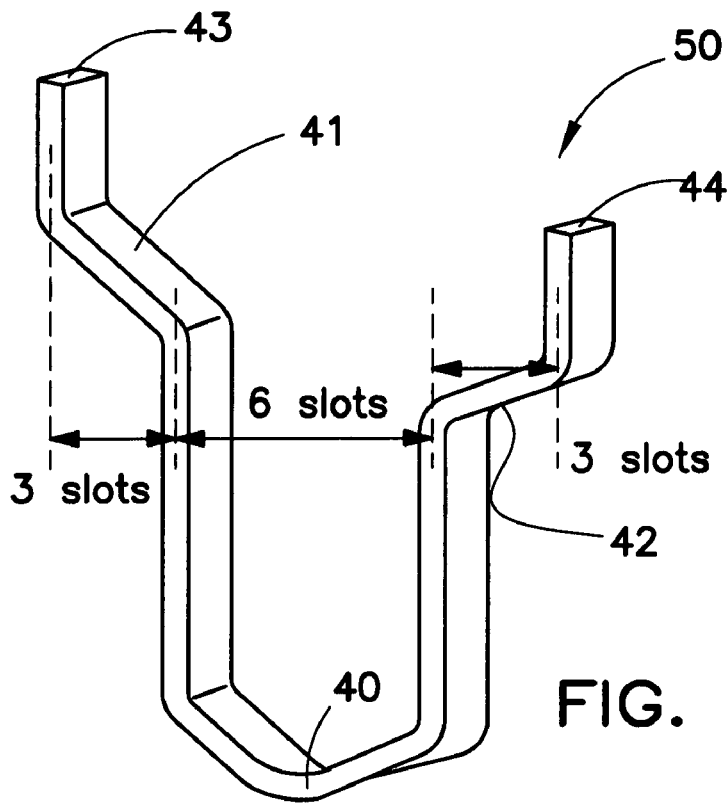
FIGS. 5A-5F shows a various hairpin conductor types used in the exemplary winding arrangement of FIGS. 6A-6C.

A first of the eight hairpin conductors is shown in FIG. 5A. This first hairpin conductor 50 is the most common conductor used for the first winding set 28. This hairpin 50 is the same general shape as the exemplary conductor of FIG. 4. However, in the particular embodiment of FIG. 5A, the U-turn portion 40 spans six slots of the first winding set ($Y_1$=6), and each leg bend portion spans 3 slots of the first winding set ($Y_2$=6; $k_1$=$k_2$=½). In the winding arrangement of FIGS. 6A-6C, sixteen of the conductors shown in FIG. 5A are required per phase, for a total of 48 conductors (16/phase×3 phases=48).

Figure 5B:
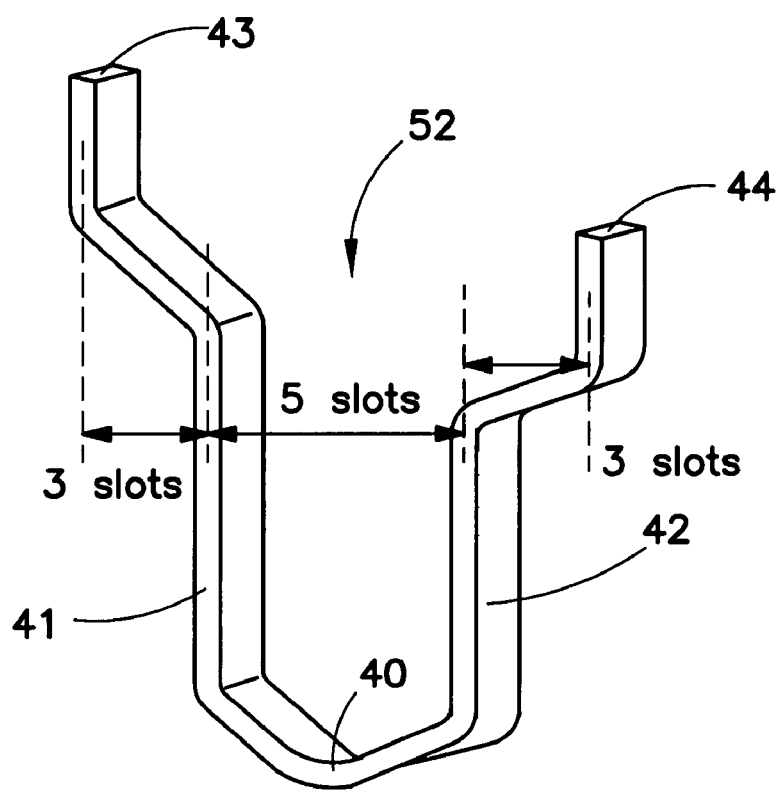

FIG. 5B shows a second hairpin conductor 52 used for the first winding set 28. This hairpin is the same as the hairpin of FIG. 5A except that the U-turn portion 40 only spans five slots of the first winding set 28, making this conductor 52 the short pitch conductor for the winding set. In the winding arrangement of FIGS. 6A-6C, two of these conductors 52 are required per phase, for a total of six conductors (2/phase×3 phases=6).

Figure 5C:
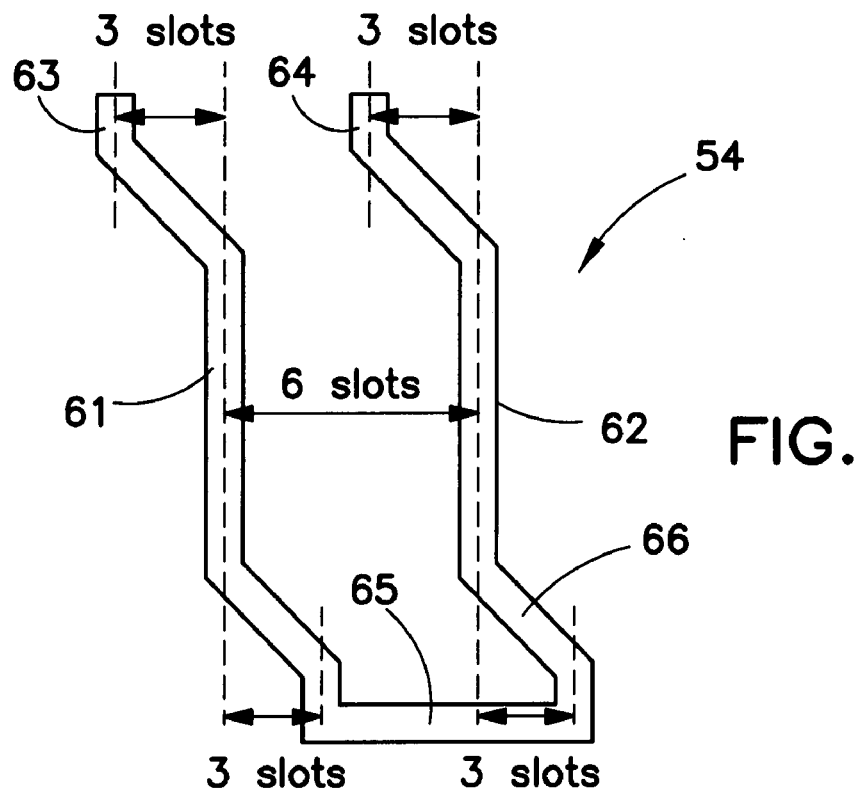
Figure 6A:
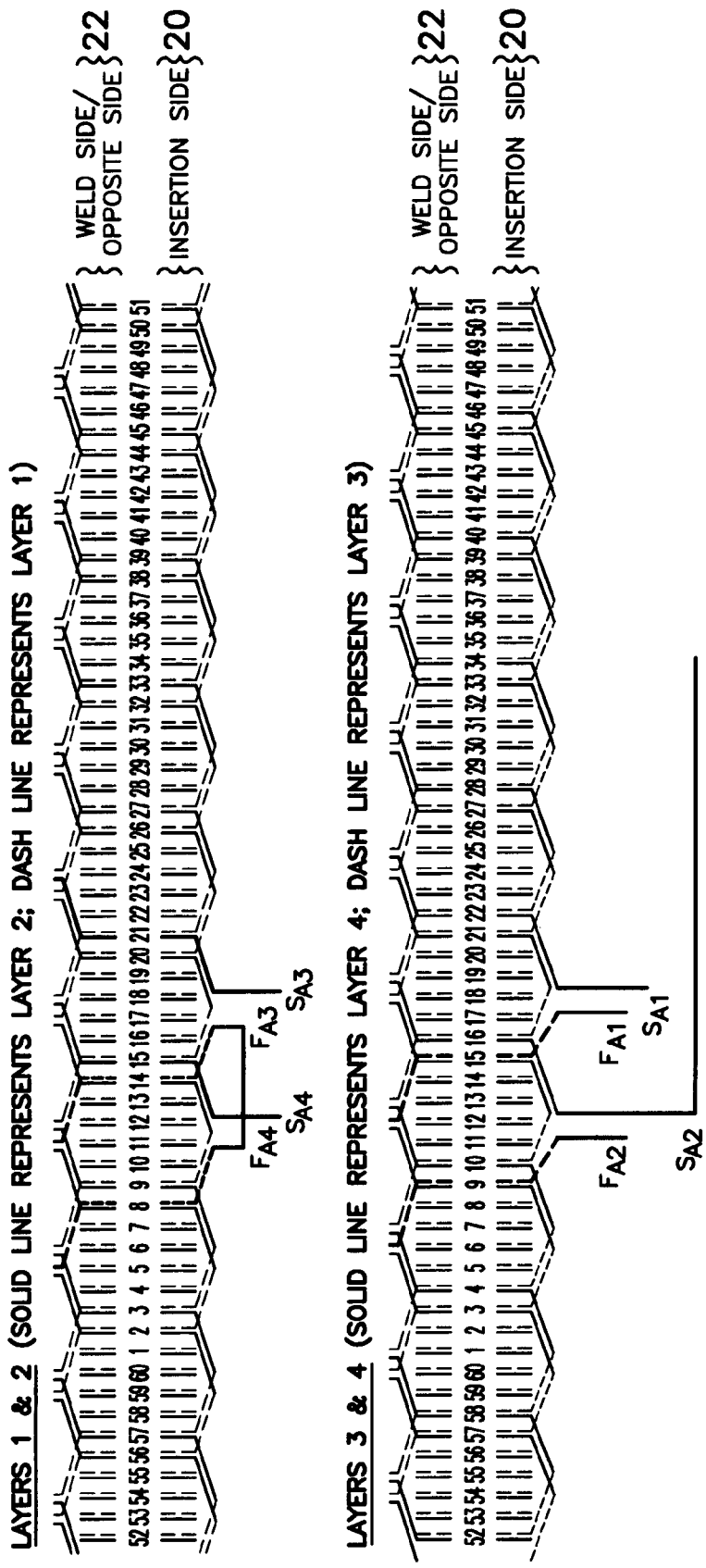
FIG. 6A shows the phase A connections for an exemplary winding arrangement.
Figure 6B:
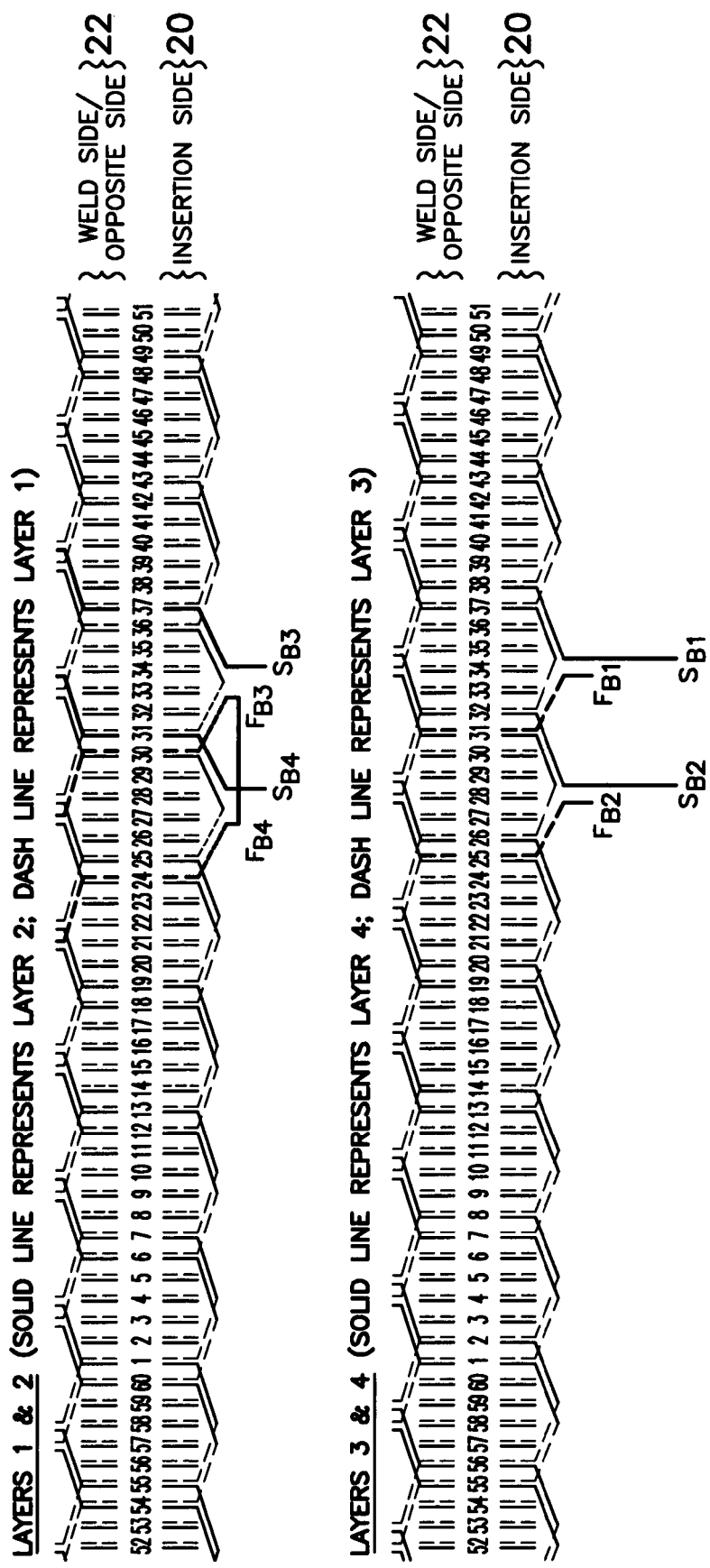
FIG. 6B shows the phase B connections for the exemplary winding arrangement.
Figure 6C:
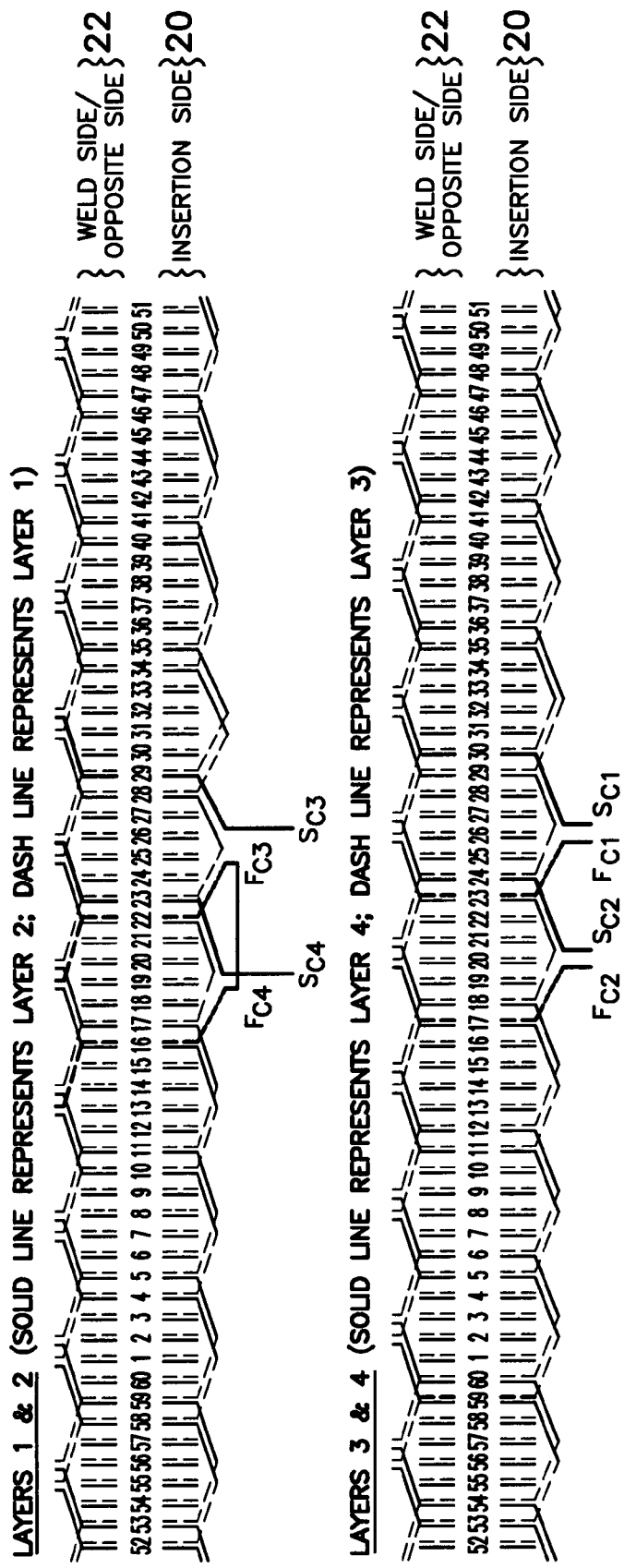
FIG. 6C shows the phase C connections for the exemplary winding arrangement.

FIG. 5C shows a third hairpin conductor 54 used for the winding arrangement of FIGS. 6A-6C. This hairpin conductor 54 includes two legs 61, 62 with a U-turn portion 65 positioned between the legs 61, 62. The U-turn portion 65 spans six slots of the first layer of the first winding set. The U-turn portion 65 also includes a three slot shift as indicated by bend portion 66. Different from the exemplary hairpin conductor 38 of FIG. 4, the leg ends 63, 64 are bent in the same direction. Each bend in the leg ends 63, 64 spans three slots. The third hairpin conductors 65 are used to connect each of the phase windings in series. A total of three of these conductors 54 are needed for the winding arrangement of FIGS. 6A-6C, one per phase.

The fourth hairpin conductor type required for the winding arrangement of FIGS. 6A-6C is identical to the first hairpin conductor 50 shown in FIG. 5A, but is slightly larger in size since it is used in the second winding set 30 instead of the first winding set. In particular, the first winding set extends along the inner perimeter of the stator while the second winding set extends closer to the outer perimeter of the stator. Thus, the distance between slots is slightly greater in the second winding set than the first winding set. Accordingly, the six-slot span of the U-turn portion of the fourth hairpin conductor is slightly larger than the six-slot span of the U-turn portion of the first hairpin conductor. The fourth hairpin conductor is the most common conductor used in the second winding set. In the winding arrangement of FIGS. 6A-6C, sixteen of the fourth conductor types are required per phase, for a total of 48 conductors (16/phase×3 phases=48).

The fifth hairpin conductor type required for the winding arrangement of FIGS. 6A-6C is identical to the second hairpin conductor 52 shown in FIG. 5A, but is slightly larger in size since it is used in the second winding set 30 instead of the first winding set 28. Accordingly, as discussed above with the first and the fourth conductor types, the five-slot span of the U-turn portion of the fifth hairpin conductor is slightly larger than the five-slot span of the U-turn portion of the second hairpin conductor. In the winding arrangement of FIGS. 6A-6C, two of the fifth type of conductors are required per phase, for a total of six conductors (2/phase×3phases=6).

Figure 5D:
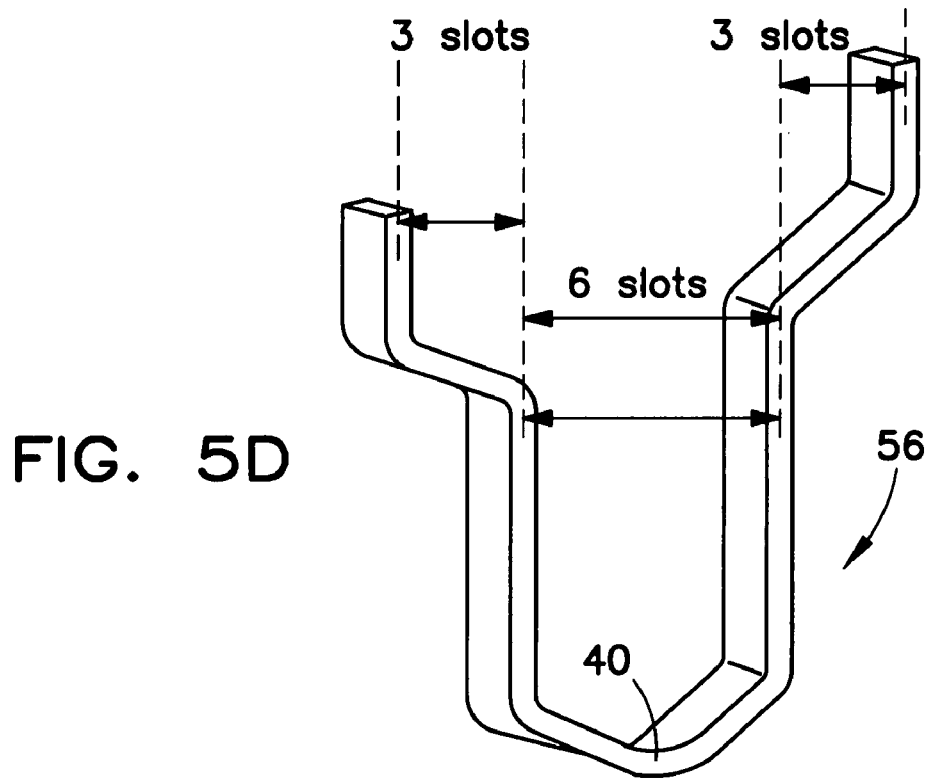

A sixth hairpin conductor 56 required for the winding arrangement of FIGS. 6A-6C is shown in FIG. 5D. This sixth hairpin conductor 56 is similar to the first hairpin conductor 50 shown in FIG. 5A, but is slightly larger in size since it is used to extend between winding sets 28, 30 (i.e., it extends six slots between the second layer 32 and the third layer 33), and provides set-to-set connections between windings in each phase. In addition, the U-turn portion 40 of the sixth hairpin conductor type 56 is bent in an opposite direction from the first hairpin conductor type 50. Two of the sixth hairpin conductor types 56 are required per phase in the winding arrangement of FIGS. 6A-6C.

Figure 5E:
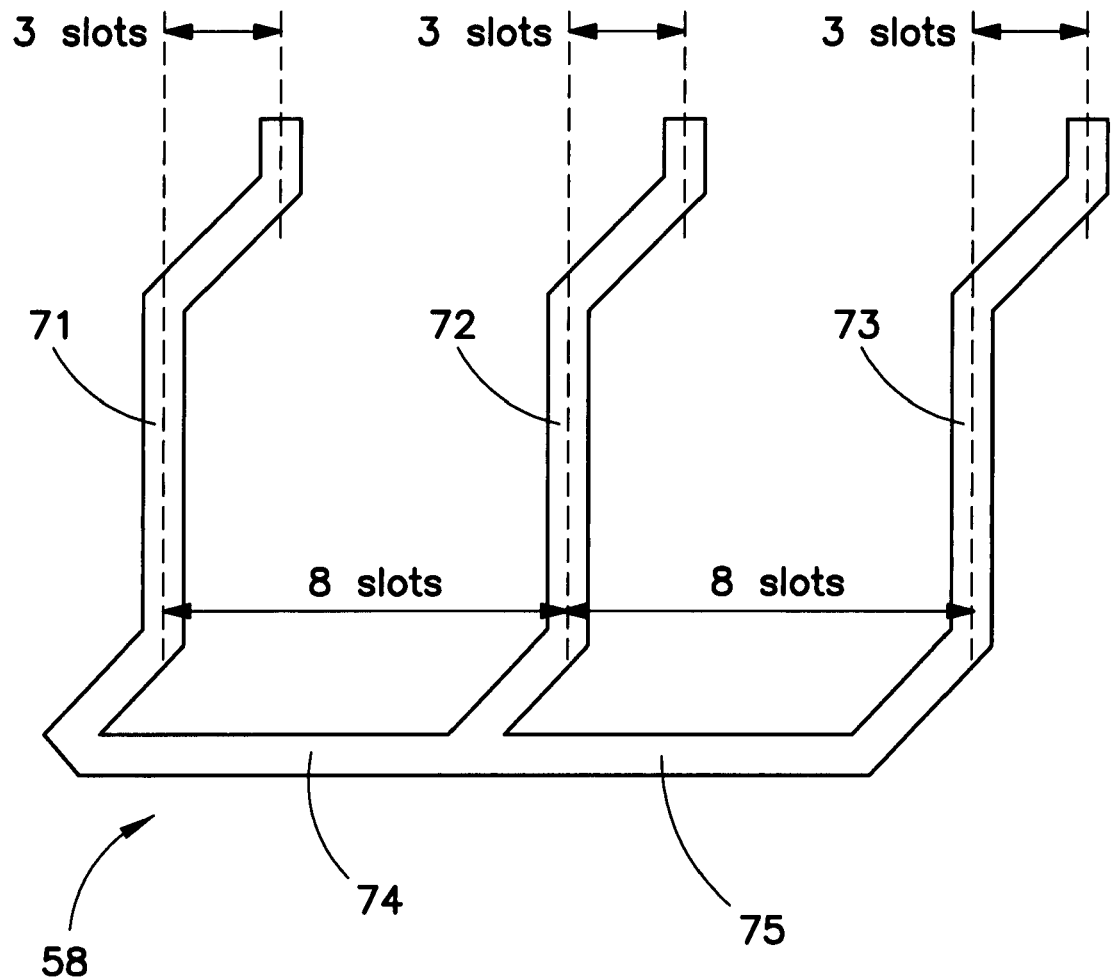

A seventh hairpin conductor type required for the winding arrangement of FIGS. 6A-6C is shown in FIG. 5E. This seventh hairpin conductor 58 is a "W" shaped conductor, including a first leg 71, a second leg 72 and a third leg 73. A first turn portion 74 is provided between the first leg 71 and the second leg 72, and a second turn portion is provided between the second leg 72 and the third leg 73. Both of the turn portions 74, 75 extend for eight slots of layer four 34 of the winding arrangement. Similar to all the other leg ends in the winding arrangement, each of the leg ends of the seventh conductor type 58 is bent three slots. Because each leg 71, 72, 73 will lie in the same layer of the winding arrangement, the legs are each bent in the same direction. This seventh hairpin conductor type is used as the neutral connection for the winding arrangement, and only one such seventh conductor 58 is required for the winding arrangement of FIGS. 6A-6C.

Figure 5F:
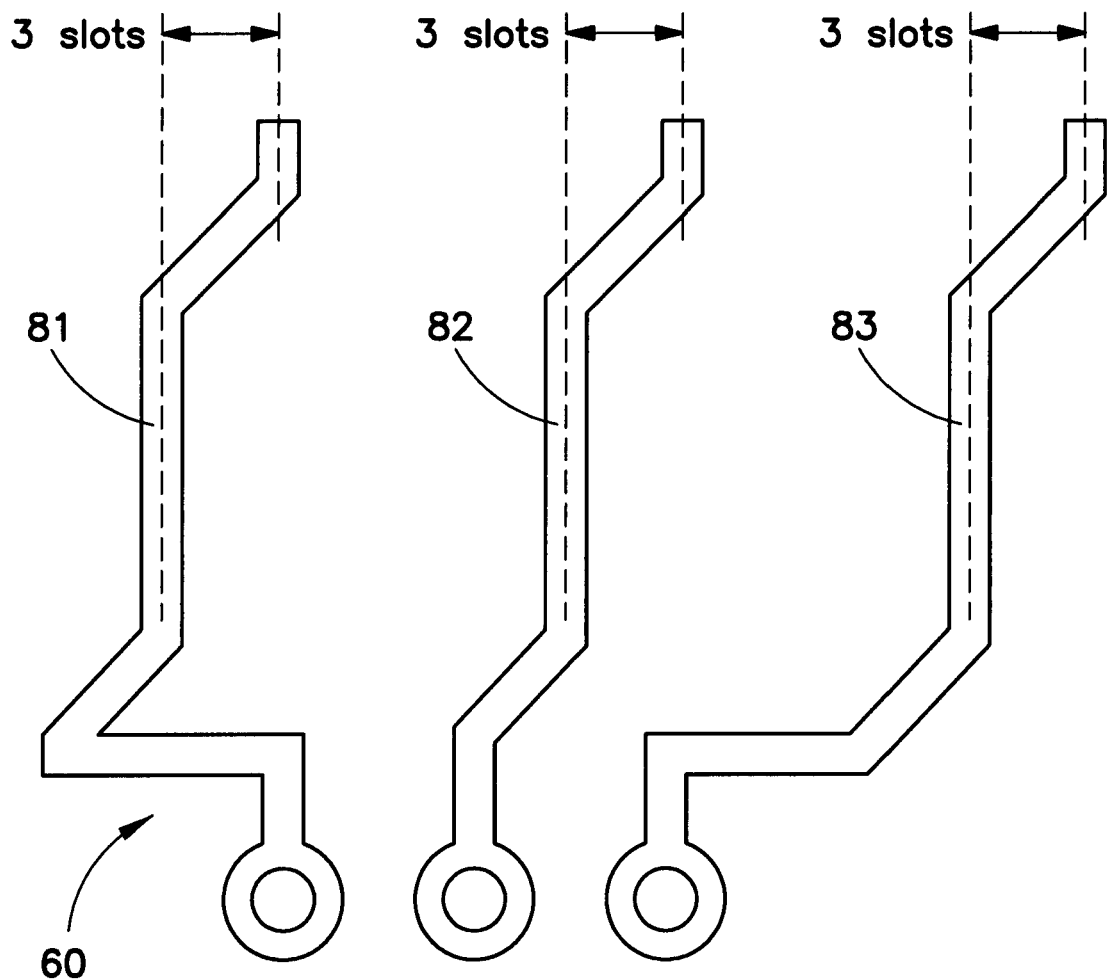

An eighth type of hairpin conductor 60 is shown in FIG. 5F. This eighth type of hairpin conductor 60 is actually three single leg conductors 81, 82, 83. These three legs provide the terminal ends for each winding phase (A, B, C) on the insertion side of the stator for the winding arrangement of FIGS. 6A-6C. Again, similar to all the other leg ends on the weld side of the winding arrangement, each of the leg ends of the eighth conductor type 60 is bent three slots. Because each leg 81, 82, 83 lie in the same layer of the winding arrangement (i.e., layer 4), the legs are each bent in the same direction.

With reference now to FIGS. 6A-6C, a winding diagram is provided showing an exemplary winding arrangement for a sixty slot stator. FIG. 6A shows the phase A windings, FIG. 6B shows the phase B windings, and FIG. 6C shows the phase C windings. As can be seen from viewing FIGS. 6A-6C, all special winding connections are provided on the insertion side of the stator via the special hairpins. Specifically, the following special winding connections are provided via the special hairpins: (i) the connections required to connect each of the phase windings in series (i.e., connections between phase paths); (ii) the connections required to connect winding sets (i.e., the connection between layer two 32 and layer three 33); (iii) the neutral connections between different phase windings; and (iv) the terminal connections for each phase winding. Each of these special winding connections is accomplished using a special type of hairpin conductor. Use of these special hairpin conductors facilitates a winding arrangement where all of the different types of hairpin conductors are inserted into the slots of the stator, all of the legs are bent the same number of slots (in alternating directions in successive layers) on the weld end of the stator, and each leg end is then connected to an immediately adjacent leg end to complete the winding arrangement (i.e., adjacent leg ends in layers 1 and 2 are connected in the radial direction and adjacent leg ends in layers 3 and 4 are connected in the radial direction).

FIG. 7 shows a view of the special connections referenced in the preceding paragraph as made at the insertion side of the stator. The first type of special connection is a connection required to connect same phase winding paths in series. These special connections are made with the third type of hairpin conductor 54, described above with reference to FIG. 5C. In FIG. 6A, the thick dash lines in layer 1, slots 8 and 14, represents two legs of the special hairpin, which connect the wave winding into one parallel path. This is also shown in FIG. 7, where two legs of the hairpin are located at layer 1 of slots 8 and 14, respectively. The partial windings in the same phase can also be connected into parallel paths although this example shows only one parallel path. Similarly, the special hairpins for connecting the same phase winding paths for phase B and phase C are shown in FIGS. 6B and 6C, as well as FIG. 7.

The second type of special connection is a connection required to connect the two winding sets 28 and 30 (i.e., a connection between layer two 32 and layer three 33). These special connections are made with the sixth type of hairpin conductor 56, described above with reference to FIG. 5D. The number of special hairpins required for connections between adjacent winding sets is equal to 2×(n−1) connections per phase, where n is the number of winding sets. For example, for two sets of hairpin windings (n=2), the connections in Phase A between winding sets are 2×(2−1)=2. Thus, two special hairpins are required to connect two winding sets. As shown in FIG. 6A and FIG. 7, a first special hairpin consists of the leg in layer 2 of slot 15 and the leg in layer 3 of slot 9 while the second special hairpin consists of the leg in layer 2 of slot 21 and the leg in layer 3 of slot 15. These hairpin conductors provide connections between winding sets of phase A and are shown with thick lines. The special hairpins for connecting winding sets of phase B are shown in FIGS. 6B and 7. The special hairpins for connecting winding sets of phase C are shown in FIGS. 6C and 7. For the two sets of hairpin windings, there are a total of six special hairpins are required to connect winding sets.

The third type of special connection is the neutral connection between different phase windings. This special connection is made with the seventh type of hairpin conductor 58 described above with reference to FIG. 5E. The neutral connection may be provided such that the windings are connected into either star-connection or delta-connection for multiphase machines. For example, if the windings are connected into Y-connection in the three phase machine in FIG. 7, the neutral point can be formed by one hairpin and a half turn wire. SA2 and SB2 become one hairpin whose two legs are in layer 4 of slots 16 and 38, respectively, and SC2 is the half turn wire in layer 4 of slot 24.

The fourth type of special connection is the terminal connection for each phase winding. This special connection is made with the eighth type of hairpin conductor 60 described above with reference to FIG. 5F.

As shown in FIG. 7, each of the four types of special connections is provided at the insertion side 20 of the stator using hairpin conductors 54, 56, 58, and 60. With the special connections made at the insertion side 20 of the stator, less crowding occurs at the opposite side 22 of the stator. In particular, the opposite side 22 of the stator simply includes a plurality of leg ends that are bent the same number of slots, in opposite directions in successive layers (i.e., layer one 31 and layer three 32 bent the same direction and layer two 32 and layer four 34 bent the opposite direction). Immediately adjacent leg ends (i.e., leg ends that are not separated by other leg ends) are then connected in the radial direction, with the leg ends from layer one 31 and layer two 32 welded together, and the leg ends from layer three 33 and layer four 34 welded together.

Figure 8A:
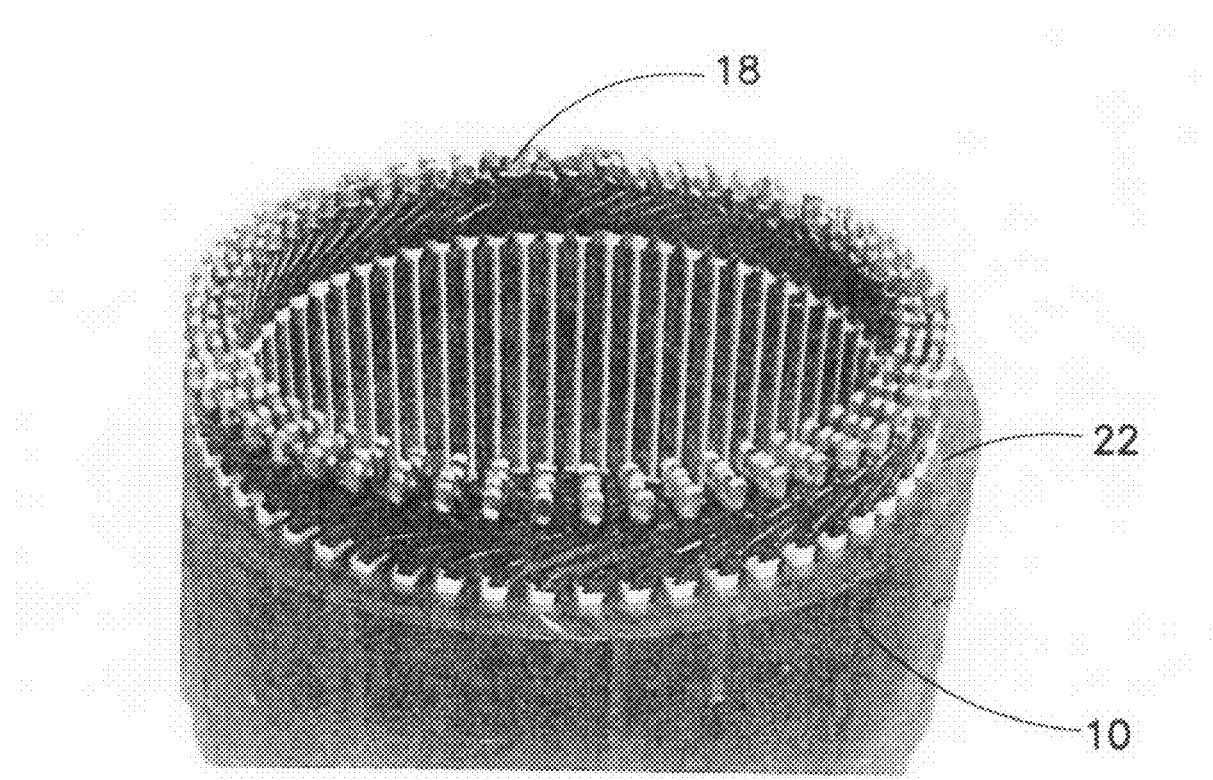
FIG. 8A shows a perspective view of a weld side of the core showing adjacent leg ends of the winding arrangement of FIGS. 6A-6C before they are connected.

FIG. 8A shows the plurality of conductor 18 legs at the weld end 22 of the stator. The legs have been bent into position such that four leg ends are aligned in a radial direction in each of sixty rows (sixty rows resulting from sixty slots). Advantageously, each leg end has been bent by the same number of slots, making the bending process easier, and providing less crowding at the weld end. Following the bending, each leg end from layer one 31 is positioned adjacent to a leg end from layer two 32. Each leg end from layer three 33 is positioned adjacent to a leg end from layer four 34.

Figure 8B:
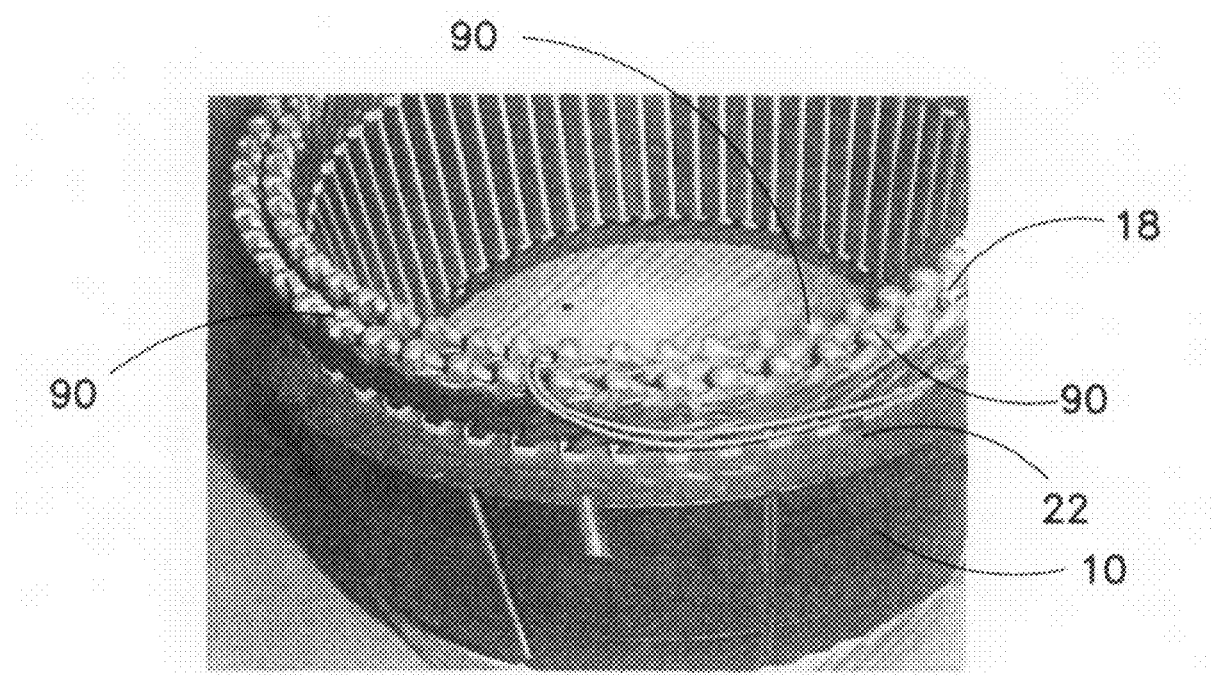
FIG. 8B shows a perspective view of the weld side of the core after the adjacent leg ends of FIG. 8A are welded together.
Figure 9D:
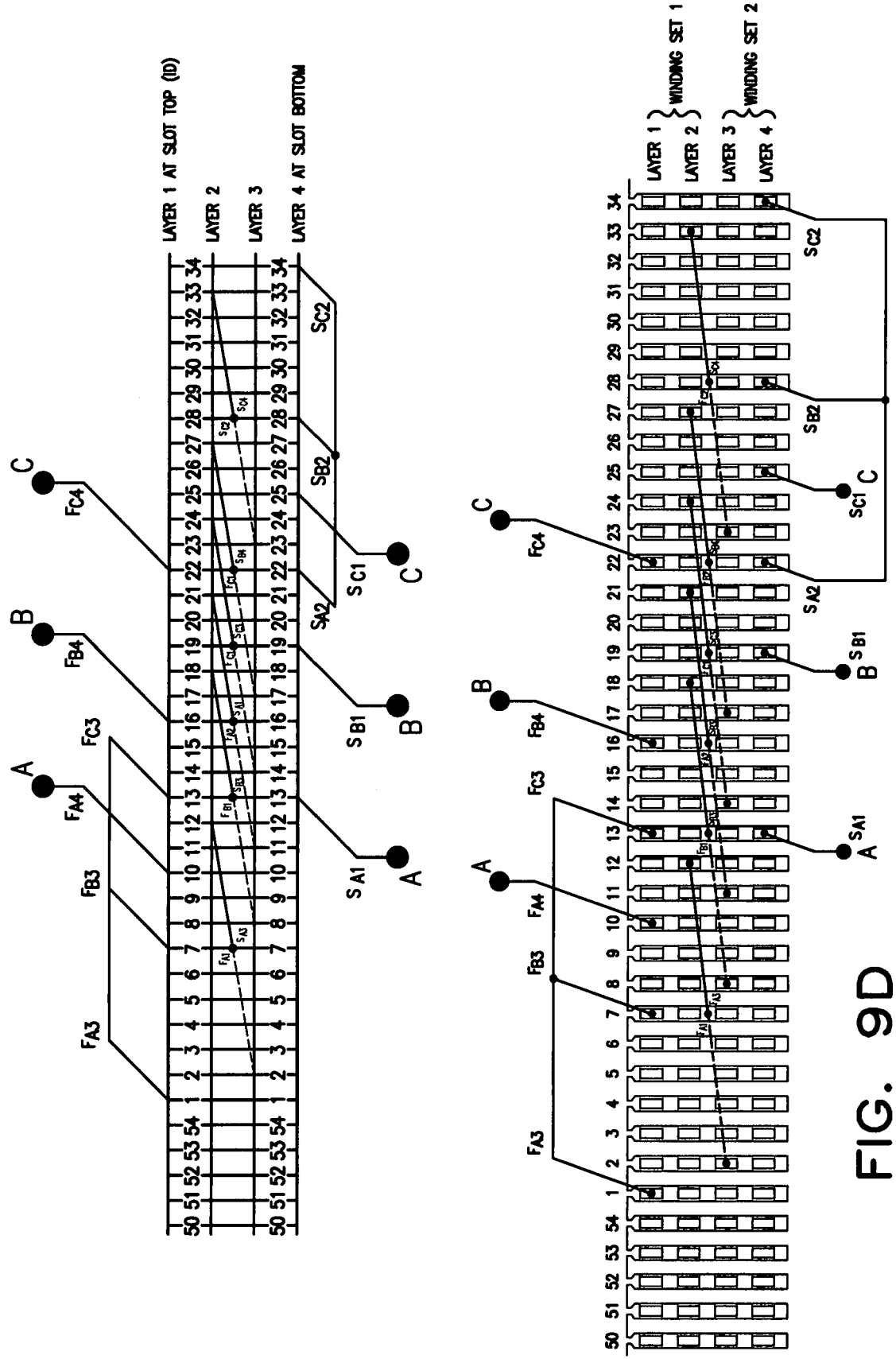

FIG. 8B shows the adjacent leg ends connected together following a weld process. Advantageously, the weld process only involves connecting adjacent leg ends, as all special connections are provided at the insertion end 20 of the stator 10 using the different hairpin conductor types described above. The simple weld process with no additional connectors at the weld end 22 results in a reliable weld process that properly makes the necessary connections to complete the winding arrangement.

FIGS. 9A-9D describe an alternative embodiment of an armature winding arrangement for a fifty-four slot stator using a plurality of different hairpin conductors. Similar to the embodiment disclosed above, the special connections are made in this winding arrangement using the different hairpin conductors, and no special connections are required at the weld end of the stator. The embodiment of the winding arrangement shown in FIGS. 9A-9D is but one example of an alternative embodiment of a winding arrangement, and those of skill in the art will recognize that numerous other winding arrangements are possible using the principles disclosed herein.

Based on the exemplary winding arrangements disclosed above with in FIGS. 5 and 6, a method of manufacturing a winding is provided. According to this method, the hairpin conductor segments of FIG. 5 are collected and inserted into the slots of the stator. The leg ends of the conductors are inserted into the insertion end of the stator and the leg ends pass through the stator to the weld end of the stator. At this point, a plurality of U-turn portions remain on the insertion end along with the bend portion of the "W" shaped neutral connector and the winding ends to be connected to the terminals.

After inserting the hairpin conductors into the slots, the legs of the hairpin-like conductors are bent to proper positions at the end of armature. Advantageously, because of the special connection hairpins described above, the leg ends are all bent a uniform number of slots (albeit in different direction for different layers) and are properly aligned to provide adjacent leg ends in sixty different radial rows. Next, the adjacent leg ends are welded, as shown in FIG. 8B, to form the multi-phase, multi-set windings. As described above, the connections between winding sets are made with special hairpins, and no additional jumpers are required. For example, the connection between layer 2 and layer 3 of the winding sets is made with a U-turn of certain hairpin conductors on the insertion side of the stator. The two legs of these special hairpins are located at different winding sets to be connected (i.e., layer 2 for set 1 and layer 3 for set 2). Thus, the joint points from these special hairpins merely connect to other hairpins in the standard fashion and will not create additional crowding among welding points. There is also no need for connection wires between phase paths since other special hairpins provide this connection, as described above. Similarly, as described above, the neutral connections and the terminals are provided at the hairpin insertion end of the stator. Accordingly, the end-turn lengths of all hairpins at the weld end (opposite the insertion end) of lamination stack of the core are all the same, and the clearances between all hairpin leg ends are equal. Therefore, the hairpin welding process may be easily and automatically accomplished by machine. Because the connections between hairpins are less crowded, welding quality is improved, and the potential of short circuits is reduced.

Although the present invention has been described with respect to certain preferred embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the preferred embodiments contained herein.

What is claimed is:

1. An electric machine comprising:
a core comprising a plurality of slots, the core including an insertion side and an opposing side;
a winding arrangement provided in the plurality of slots of the core, the winding arrangement comprised of a plurality of differently shaped hairpin conductors, each of the plurality of differently shaped hairpin conductors including at least one leg inserted into one of the plurality of slots with a leg end of the at least one leg extending from the opposing side of the core;
wherein the plurality of differently shaped hairpin conductors form at least two winding sets, including a first winding set and a second winding set, the first winding set provided in a first conductor layer and a second conductor layer in the plurality of slots and the second winding set provided in a third conductor layer and a fourth conductor layer in the plurality of slots; and
wherein all the leg ends extending from the opposing side of the core for the winding arrangement are bent the same number of slots and connected to immediately adjacent leg ends at the opposing side of the core; and
wherein the connections between the differently shaped hairpin conductors are all provided at the opposing side of the core.

2. The electric machine of claim 1 wherein all of the plurality of differently shaped hairpin conductors, with the exception of hairpin conductors that provide terminal connections, include U-turn portions provided at the insertion side of the core and no connections between any hairpin conductors are made at the insertion side of the core.

3. The electric machine of claim 2 wherein all of the plurality of differently shaped hairpin conductors, with the exception of hairpin conductors that provide terminal connections, include at least two legs and a U-turn portion provided between at least two legs.

4. The electric machine of claim 1 wherein the first winding set and the second winding set are both multi-phase winding sets.

5. The electric machine of claim 1 wherein the plurality of differently shaped hairpin conductors that form the first set are mostly comprised of a first standard hairpin conductor having a U-turn portion spanning a predetermined number of slots in the first set, and wherein the plurality of differently shaped hairpin conductors that form the second set are mostly comprised of a second standard hairpin conductor having a U-turn portion spanning the predetermined number of slots in the second set.

6. The electric machine of claim 5 wherein the plurality of differently shaped hairpin conductors further comprise a plurality of hairpin conductors configured to connect phase windings of the same phase in series.

7. The electric machine of claim 5 wherein the plurality of differently shaped hairpin conductors further comprise a plurality of hairpin conductors configured to connect the first winding set and the second winding set.

8. The electric machine of claim 7 wherein each of the plurality of hairpin conductors configured to connect the first winding set and the second winding set each include a U-turn portion at the insertion side of the core that extends between a leg in the second conductor layer and a leg in the third conductor layer.

9. The electric machine of claim 6 wherein the plurality of differently shaped hairpin conductors further comprise a hairpin conductor configured to connect neutral connections between phase windings.

10. The electric machine of claim 6 wherein the plurality of differently shaped hairpin conductors further comprise terminal connections for the phase windings.

11. A winding arrangement provided on an electric machine core including a plurality of slots, an insertion side and an opposite side, the winding arrangement comprising:
a plurality of conductor segments positioned in the slots, each of the plurality of conductor segments bent into one of several shapes, the plurality of conductor segments connected together to form at least two winding sets, including a first winding set and a second winding set, wherein the first winding set and the second winding set are both multi-phase windings, each of the plurality of conductor segments comprising at least one leg end extending from the opposite side of the core and bent a predetermined number of slots, each leg end connected to an immediately adjacent leg end on the opposite side of the core;
wherein the plurality of conductor segments include at least one first conductor segment including two legs and a U-turn portion, the first conductor segment configured to connect same phase windings of the multi-phase windings in series; and
wherein the plurality of conductor segments include at least one second conductor segment including two legs and a U-turn portion, the second conductor segment configured to connect the first winding set and the second winding set.

12. The winding arrangement of claim 11 wherein none of the plurality of conductor segments are connected to another conductor segment at the insertion side of the core.

13. The winding arrangement of claim 11 wherein the legs extending from the opposite side of the core are arranged in radial rows, and each leg end in a radial row is connected to an adjacent leg end in the same radial row.

14. The winding arrangement of claim 11 wherein the first winding set is provided in a first conductor layer and a second conductor layer in the slots, the first winding layer adjacent to the second winding layer, and wherein the second winding set is provided in a third conductor layer and a fourth conductor layer in the slots, the third winding layer adjacent to the fourth winding layer.

15. The winding arrangement of claim 14 wherein the U-turn portion of the at least one second conductor segment extends between the second conductor layer and the third conductor layer on the insertion side of the core.

16. The winding arrangement of claim 11 wherein the plurality of conductor segments further include a third conductor segment configured to provide a neutral connection between the multi-phase windings, the third conductor comprising a first leg, a second leg and a third leg, and a first turn provided between the first leg and the second leg and a second turn provided between the second leg and the third leg, wherein the first turn and second turn of the third conductor segment extend from the insertion end and the first leg, the second leg and the third leg of the third conductor segment extending from the opposite end of the core.

17. The winding arrangement of claim 11 wherein the plurality of conductor segments further include a first terminal conductor segment, a second terminal conductor segment, and a third terminal conductor segment, each of the first, second and third terminal conductor segments comprising a leg with a first end extending from the insertion end of the core and a second end extending from the opposite end of the core, wherein the first terminal conductor segment is connected to a first winding phase, the second terminal conductor segment is connected to a second winding phase, and the third terminal conductor segment is connected to a third winding phase.

18. An electric machine comprising:

a core comprising a plurality of slots, the core including an insertion side and an opposing side;

a winding arrangement provided in the plurality of slots of the core, the winding arrangement comprising a plurality of differently shaped U-turn conductor segments configured to provide at least two three-phase winding sets, each of the plurality of differently shaped U-turn conductor segments including at least one U-turn portion extending between at least two slots on the insertion side of the core and at least two leg ends, each leg end extending from one of the at least two slots on the opposing side of the core; and wherein all the leg ends extending from the opposing side of the core are bent the same number of slots and are connected to immediately adjacent leg ends on the opposing side of the core.

19. The electric machine of claim 18 wherein the winding arrangement consists of the plurality of differently shaped U-turn conductor segments and three single leg conductors, each of the single leg conductor positioned in one of the slots of the core and including a terminal end extending from the insertion side of the core and a leg end from the opposing side of the core, wherein the leg end of each single leg conductor is bent the same number of slots as the leg ends of the plurality of differently shaped U-turn conductor segments, and wherein the terminal end of each single leg conductor provides a terminal for one of the three winding phases.

20. The electric machine of claim 19 wherein one of the plurality of differently shaped U-turn conductor segments is a W-shaped conductor segment, the W-shaped conductor segment including a first U-turn portion connecting a first leg end and a second leg end and a second U-turn portion connecting the second leg end and a third leg end, wherein the W-shaped conductor segment provides a neutral connection between the three-phase winding sets.

* * * * *

UNITED STATES PATENT AND TRADEMARK OFFICE
CERTIFICATE OF CORRECTION

| | | |
|---|---|---|
| PATENT NO. | : 7,622,843 B2 | Page 1 of 1 |
| APPLICATION NO. | : 11/811472 | |
| DATED | : November 24, 2009 | |
| INVENTOR(S) | : Wei Cai | |

It is certified that error appears in the above-identified patent and that said Letters Patent is hereby corrected as shown below:

Title Page:

Item (73) Assignee:

Change "Rerry International, Inc." to --Remy International, Inc.--

Signed and Sealed this

Sixteenth Day of August, 2011

David J. Kappos
*Director of the United States Patent and Trademark Office*